(12) United States Patent
Kawamura et al.

(10) Patent No.: US 10,570,476 B2
(45) Date of Patent: Feb. 25, 2020

(54) HIGH-STRENGTH STEEL SHEET AND PRODUCTION METHOD THEREFOR

(71) Applicant: JFE STEEL CORPORATION, Tokyo (JP)

(72) Inventors: Kenji Kawamura, Chiba (JP); Noriaki Kohsaka, Fukuyama (JP); Yasuhiro Nishimura, Kurashiki (JP)

(73) Assignee: JFE STEEL CORPORATION, Tokyo (JP)

( * ) Notice: Subject to any disclaimer, the term of this patent is extended or adjusted under 35 U.S.C. 154(b) by 188 days.

(21) Appl. No.: 15/561,224

(22) PCT Filed: Aug. 20, 2015

(86) PCT No.: PCT/JP2015/004179
§ 371 (c)(1),
(2) Date: Sep. 25, 2017

(87) PCT Pub. No.: WO2016/157258
PCT Pub. Date: Oct. 6, 2016

(65) Prior Publication Data
US 2018/0057907 A1    Mar. 1, 2018

(30) Foreign Application Priority Data
Mar. 27, 2015    (JP) .................. 2015-066219

(51) Int. Cl.
| | |
|---|---|
| *C21D 9/46* | (2006.01) |
| *B32B 15/01* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/16* | (2006.01) |
| *C22C 38/26* | (2006.01) |
| *C22C 38/28* | (2006.01) |
| *C22C 38/38* | (2006.01) |
| *C23C 2/06* | (2006.01) |
| *C23C 2/28* | (2006.01) |

(52) U.S. Cl.
CPC .............. *C21D 9/46* (2013.01); *B32B 15/013* (2013.01); *C21D 6/001* (2013.01); *C21D 6/002* (2013.01); *C21D 6/005* (2013.01); *C21D 6/008* (2013.01); *C21D 8/0247* (2013.01); *C22C 38/001* (2013.01); *C22C 38/002* (2013.01); *C22C 38/005* (2013.01); *C22C 38/02* (2013.01); *C22C 38/06* (2013.01); *C22C 38/08* (2013.01); *C22C 38/16* (2013.01); *C22C 38/26* (2013.01); *C22C 38/28* (2013.01); *C22C 38/38* (2013.01); *C23C 2/06* (2013.01); *C23C 2/28* (2013.01)

(58) Field of Classification Search
CPC .......... C21D 9/46; C21D 6/001; C21D 6/002; C21D 6/005; C21D 6/008; C21D 8/0247; B32B 15/013; C22C 38/00; C22C 38/001; C22C 38/002; C22C 38/005; C22C 38/02; C22C 38/06; C22C 38/08; C22C 38/14; C22C 38/16; C22C 38/26; C22C 38/28; C22C 38/38; C22C 38/60; C23C 2/06; C23C 2/28

See application file for complete search history.

(56) References Cited

U.S. PATENT DOCUMENTS

| | | |
|---|---|---|
| 3,935,683 A | 2/1976 | Derner et al. |
| 2002/0106463 A1 | 8/2002 | Wang |
| 2012/0088045 A1 | 4/2012 | Veerasamy |
| 2015/0068666 A1 | 3/2015 | Abe et al. |

FOREIGN PATENT DOCUMENTS

| | | | | |
|---|---|---|---|---|
| EP | 1731627 A1 | * | 12/2006 | ............... C21D 9/46 |
| JP | 4997810 A | | 9/1974 | |
| JP | 05209482 A | | 8/1993 | |
| JP | 2001030391 A | | 2/2001 | |
| JP | 2001192768 A | * | 7/2001 | |
| JP | 2001316138 A | | 11/2001 | |
| JP | 2003342683 A | | 12/2003 | |
| JP | 2004238679 A | | 8/2004 | |
| JP | 2008106351 A | | 5/2008 | |
| JP | 2008190032 A | | 8/2008 | |
| JP | 2009114523 A | | 5/2009 | |
| JP | 4640130 A | | 3/2011 | |
| WO | 2014162661 A1 | | 10/2014 | |
| WO | 2013172033 A1 | | 1/2016 | |

OTHER PUBLICATIONS

Extended European Search Report for European Application No. 15887415.6, dated Nov. 17, 2017, 11 pages.
International Search Report and Written Opinion for International Application No. PCT/JP2016/004179, dated Dec. 20, 2016—7 Pages.

* cited by examiner

*Primary Examiner* — Anthony J Zimmer
*Assistant Examiner* — Ricardo D Morales
(74) *Attorney, Agent, or Firm* — RatnerPrestia

(57) ABSTRACT

A high-strength steel sheet having excellent punchability and a tensile strength of at least 780 MPa has a steel structure containing, by area ratio, 70%-90% ferrite phase and 10%-30% martensite phase. The non-recrystallized ferrite content in the ferrite phase is 30%-50% and the ratio of crystal grains having an aspect ratio of 1.0-1.5 in the martensite phase is 40%-100%, by area ratio.

8 Claims, No Drawings

HIGH-STRENGTH STEEL SHEET AND PRODUCTION METHOD THEREFOR

CROSS REFERENCE TO RELATED APPLICATIONS

This is the U.S. National Phase application of PCT/JP2015/004179, filed Aug. 20, 2015, which claims priority to Japanese Patent Application No. 2015-066219, filed Mar. 27, 2015, the disclosures of these applications being incorporated herein by reference in their entireties for all purposes.

TECHNICAL FIELD OF THE INVENTION

The present invention relates to a high-strength steel sheet excellent in punchability, having a tensile strength (TS) of 780 MPa or more, and suitable for use as automobile body frame members. The invention also relates to a method for producing the high-strength steel sheet.

BACKGROUND OF THE INVENTION

To reduce the weight of automobile bodies, high-strength steel sheets are actively used as materials of automobile components. Steel sheets used for structural members and reinforcing members of automobiles are mainly steel sheets having a tensile strength (TS) of 780 MPa or more. To strengthen a steel sheet, it is effective to utilize structural strengthening, and one method is to form a complex structure including soft ferrite and hard martensite. Generally, a steel sheet having this complex structure has good ductility, an excellent strength-ductility balance (compatibility), and relatively good press formability. However, in the steel sheet having the complex structure, its material properties such as tensile strength (TS) vary greatly in response to changes in the conditions of production such as annealing temperature in an ordinary continuous annealing line, and therefore the material properties tend to vary in the lengthwise direction of a coil.

The high-strength steel sheets used as materials of automobile components are subjected to punching and therefore required to have punchability. The required punchability is that the amount of wear of the punch and die is small, i.e., continuous punchability is excellent, and that variations in press formability of punched edge faces and their vicinities when continuous punching is performed are small.

When punching is performed in an actual component production process, it is difficult to control clearance (the clearance between the punch and die) to be constant because of issues such as the mounting accuracy of the die, and the clearance fluctuates within the range of 5 and 20%. Therefore, when variations in material properties within a single coil or between coils are large, variations in press formability of punched edge faces formed by punching and their vicinities are large. In this case, it is difficult to perform press forming stably in a continuous press line for automobiles. When stable press forming is difficult, it is feared that workability may deteriorate significantly.

In a highly formable high-strength cold-rolled steel sheet described in Patent Literature 1, certain amounts of Si and Al are added to reduce changes in structure caused by fluctuations in annealing conditions to thereby reduce variations in mechanical properties such as elongation and stretch flangeability.

Patent Literature 2 discloses a hot-rolled steel sheet in which deterioration in punchability is prevented by reducing the contents of Ti-based nitrides in the steel sheet.

CITATION LIST

Patent Literature

PTL 1: Japanese Patent No. 4640130
PTL 2: Japanese Unexamined Patent Application Publication No. 2003-342683

SUMMARY OF INVENTION

Technical Problem

With the technique described in Patent Literature 1, the variations in the material properties of the steel sheet can be reduced. However, when punching is performed in a continuous press line, the punch and die damage as the number of times the punching is performed increases, and it is inevitable that the clearance between the punch and die fluctuates. Therefore, it is difficult to maintain the formability of punched edge faces and their vicinities constant, and a problem arises in that cracking occurs during press forming in some cases. In particular, a high-strength steel sheet of 780 MPa or more is more susceptible to cracking than a steel sheet of 590 MPa or less. Therefore, in the high-strength steel sheet of 780 MPa or more, the variations in formability of punched edge faces and their vicinities directly lead to cracking during press forming. In the high-strength steel sheet with a TS of 780 MPa or more, its steel structure contains hard martensite in order to strengthen the steel sheet. Therefore, when the high-strength steel sheet is subjected to punching, voids are formed at the boundary between the martensite and ferrite, causing deterioration in the required press formability. When the clearance is constant each time punching is performed, the formability of the punched edge faces and their vicinities is stable. However, when the clearance fluctuates, damage to punched edge faces of the steel sheet varies, and it is unfortunately difficult to perform continuous pressing stably.

In the hot-rolled steel sheet in Patent Literature 2, a ferrite-bainite structure composed mainly of ferrite is recommended. Therefore, the technique in Patent Literature 2 does not address the above problem at the martensite-ferrite interface that occurs in two-phase structure steel composed mainly of ferrite and martensite. The evaluation described in Patent Literature 2 is performed only for punching at a constant clearance, and the formability of punched edge faces is not stabilized when the clearance fluctuates.

The present invention has been made in view of the above circumstances, and it is an object to provide a high-strength steel sheet excellent in punchability and having a TS of 780 MPa or more and to provide a method for producing the high-strength steel sheet.

Solution to Problem

To solve the above problems, the present inventors have conducted extensive studies on various factors causing variations in formability of punched edge faces and their vicinities when continuous punching is performed. As a result, the inventors have found that a high-strength hot-dip galvanized steel sheet having a TS of 780 MPa or more and excellent in punchability can be obtained by using, as its steel structure, a two-phase structure which is composed basically of a ferrite phase and a martensite phase, in which from 30% to 50% inclusive of the ferrite phase is non-recrystallized ferrite, and in which, in the martensite phase, the area fraction of crystal grains with an aspect ratio of from 1.0 to 1.5 inclusive is 40% to 100%.

More specifically, the present invention provides the following.

[1] A high-strength steel sheet having a tensile strength of 780 MPa or more, the high-strength steel sheet having a chemical composition comprising, in mass %, C: from 0.07% to 0.15% inclusive, Si: from 0.01% to 0.50% inclusive, Mn: from 1.6% to 2.4% inclusive, P: from 0.001% to 0.050% inclusive, S: from 0.0005% to 0.010% inclusive, sol. Al: from 0.005% to 0.100% inclusive, N: from 0.0001% to 0.0060% inclusive, and Ti: from 0.01% to 0.10% inclusive and further optionally comprising Nb: from 0.01% to 0.10% inclusive, with the balance being Fe and unavoidable impurities, the total content of Ti and Nb being from 0.04% to 0.17% inclusive, the chemical composition satisfying formula (1) below, wherein the high-strength steel sheet has a steel structure containing a ferrite phase at an area fraction of from 70% to 90% inclusive and a martensite phase at an area fraction of from 10% to 30% inclusive, wherein the amount (ratio) of non-recrystallized ferrite contained in the ferrite phase is from 30% to 50% inclusive, and wherein, in the martensite phase, the area fraction of crystal grains with an aspect ratio of from 1.0 to 1.5 inclusive is 40% to 100%:

$$0.05 \leq C - (12/93)Nb - (12/48)(Ti - (48/14)N - (48/32)S) \leq 0.10, \quad (1)$$

wherein, in formula (1), each element symbol represents the content of the element and is 0 when the element is not contained.

[2] The high-strength steel sheet according to [1], wherein the chemical composition further comprises, in mass %, at least one selected from Mo: from 0.05% to 1.00% inclusive, Cr: from 0.05% to 1.00% inclusive, V: from 0.02% to 0.50% inclusive, Zr: from 0.02% to 0.20% inclusive, B: from 0.0001% to 0.0030% inclusive, Cu: from 0.05% to 1.00% inclusive, and Ni: from 0.05% to 1.00% inclusive.

[3] The high-strength steel sheet according to [1] or [2], wherein the chemical composition further comprises, in mass %, at least one element selected from Ca: from 0.001% to 0.005% inclusive, Sb: from 0.0030% to 0.0100% inclusive, and REM: from 0.001% to 0.005% inclusive.

[4] The high-strength steel sheet according to any of [1] to [3], wherein the martensite phase has an average grain diameter of 2.0 µm or less.

[5] A method for producing the high-strength steel sheet according to any of [1] to [4], the method comprising subjecting a steel slab having the chemical composition according to any of [1] to [3] to hot rolling, cold rolling, primary annealing, and secondary annealing, wherein an annealing temperature (Ta1 (° C.)) in the primary annealing satisfies formula (2) below, wherein an annealing time (t1) in the primary annealing is from 10 seconds to 200 seconds inclusive, wherein the annealing temperature in the primary annealing and the annealing time in the primary annealing satisfy formula (3) below, wherein an annealing temperature (Ta2 (° C.)) in the secondary annealing satisfies formula (4) below, and wherein an annealing time in the secondary annealing is from 10 seconds to 100 seconds inclusive:

$$0.50 \leq (Ta1 - Ac1)/(Ac3 - Ac1) \leq 0.85, \quad (2)$$

$$-0.0012t1 + 0.65 \leq (Ta1 - Ac1)/(Ac3 - Ac1) - 0.0025t1 + 1.0, \quad (3)$$

$$0.70 \leq (Ta2 - Ac1)/(Ac3 - Ac1) \leq 0.85. \quad (4)$$

[6] The method for producing the high-strength steel sheet according to [5], the method further comprising, after the secondary annealing, performing cooling and then performing galvanization.

[7] The method for producing the high-strength steel sheet according to [6], the method further comprising, after the galvanization, performing galvannealing.

In the present invention, the high-strength steel sheet is intended to encompass a high-strength steel sheet having a coating layer and a high-strength steel sheet having a galvannealed layer.

Advantageous Effects of Invention

According to the present invention, a high-strength steel sheet having a high-tensile strength of 780 MPa or more and excellent in punchability is obtained. The application of the high-strength steel sheet of the present invention to frame members of automobile bodies can contribute to improvement in collision safety and weight reduction significantly.

In the present invention, "excellent in punchability" means that $\Delta\lambda$ derived using a method described in EXAMPLES is 10 or less and $\lambda/\text{ave}\lambda_{5-20}$ is from 0.90 to 1.20 inclusive. Preferably, $\Delta\lambda$ is 8 or less, and $\lambda/\text{ave}\lambda_{5-20}$ is from 1.00 to 1.15 inclusive.

DESCRIPTION OF EMBODIMENTS

Embodiments of the present invention will next be described. However, the present invention is not limited to the following embodiments.

<High-Strength Steel Sheet>

First, the chemical composition of the high-strength steel sheet of the present invention will be described. In the following description, "%" representing the content of a component means "mass %."

The high-strength steel sheet of the present invention has a chemical composition comprising, in mass %, C: from 0.07% to 0.15% inclusive, Si: from 0.01% to 0.50% inclusive, Mn: from 1.6% to 2.4% inclusive, P: from 0.001% to 0.050% inclusive, S: from 0.0005% to 0.010% inclusive, sol. Al: from 0.005% to 0.100% inclusive, N: from 0.0001% to 0.0060% inclusive, and Ti: from 0.01% to 0.10% inclusive and further optionally comprising Nb: from 0.01% to 0.10% inclusive, with the balance being Fe and unavoidable impurities. The total content of Ti and Nb is from 0.04% to 0.17% inclusive, and the chemical composition satisfies formula (1) described later.

C: From 0.07% to 0.15% Inclusive

C is an element effective in strengthening the steel sheet and contributes to the strengthening through the formation of martensite. C forms fine carbides or carbonitrides with carbide-forming elements such as Nb and Ti to thereby contribute to the strengthening. To obtain these effects, the content of C must be 0.07% or more. If the content of C exceeds 0.15%, spot-weldability deteriorates significantly. If the content of C exceeds 0.15%, the amount of the martensite phase increases, and this causes the steel sheet to be hardened, so that press formability may deteriorate. Therefore, the content of C is from 0.07% to 0.15% inclusive. In terms of ensuring a TS of 780 MPa or more stably, the content of C is preferably 0.08% or more. In terms of ensuring the formability of punched edge faces and their vicinities stably after punching, the content of C is more preferably 0.12% or less.

Si: From 0.01% to 0.50% Inclusive

The addition of Si causes deterioration in surface properties due to the formation of red scale etc. and deterioration in coating adherence and adhesion. Therefore, the content of Si is 0.50% or less. In a hot-dip galvanized steel sheet, the content of Si is preferably 0.20% or less. Si is an element that improves ductility and contributes to improvement in strength. To obtain these effects, the content of Si must be 0.01% or more. Therefore, the content of Si is from 0.01% to 0.50% inclusive.

Mn: From 1.6% to 2.4% Inclusive

Mn is an element effective in increasing the strength of the steel sheet and is an element that functions effectively to obtain a complex structure. To ensure the strength by allowing low-temperature transformation phases to be stably formed during a cooling process from the austenite present at the time of heating and annealing, the content of Mn must be 1.6% or more. If the content of Mn exceeds 2.4%, segregation of Mn in a portion positioned one-half the thickness of the sheet, i.e., a so-called Mn band, occurs significantly. Since the hardenability of the segregated portion is high, a large amount of belt-shaped martensite is formed in the direction of rolling, causing a significant deterioration in press formability. Therefore, the content of Mn is from 1.6% to 2.4% inclusive. Preferably, the content of Mn is from 1.8% to 2.2% inclusive.

P: From 0.001% to 0.050% Inclusive

P is an element that dissolves in the steel and contributes to strengthening of the steel sheet. However, P is also an element that segregates at grain boundaries and therefore causes a reduction in grain boundary binding force and deterioration in workability. In addition, P is concentrated on the surface of the steel sheet, and this causes a reduction in chemical conversion treatability, corrosion resistance, etc. If the content of P exceeds 0.050%, the above influences become significant. However, an excessive reduction in the content of P causes an increase in production cost. Therefore, the content of P is from 0.001% to 0.050% inclusive.

S: From 0.0005% to 0.010% Inclusive

S is an element that adversely affects workability. When the content of S is high, S is present as MnS inclusions. This causes, in particular, deterioration in local ductility of the material and results in deterioration in workability. Moreover, the presence of sulfides causes deterioration in weldability. These adverse effects can be avoided when the content of S is 0.010% or less. It is preferable that the content of S is 0.005% or less, because press workability can be improved significantly. However, an excessive reduction in the content of S causes an increase in production cost. Therefore, the content of S is from 0.0005% to 0.010% inclusive.

Sol. Al: From 0.005% to 0.100% Inclusive

Al is an element effective as a deoxidizing agent. To obtain this effect, the content of sol. Al is 0.005% or more. If the content of sol. Al exceeds 0.100%, the cost of raw materials increases, and Al may cause surface defects in the steel sheet. Therefore, the content of Al in the form of sol. Al is from 0.005% to 0.100% inclusive.

N: From 0.0001% to 0.0060% Inclusive

In the present invention, it is preferable that the content of N is as small as possible. In the present invention, the allowable content of N is up to 0.0060%. An excessive reduction in the content of N causes an increase in production cost. Therefore, the content of N is from 0.0001% to 0.0060% inclusive.

Ti: From 0.01% to 0.10% Inclusive

Ti is an important element in the present invention. Fine precipitates of Ti (mainly carbide, nitride, and carbonitride. These are hereinafter referred to as carbonitrides) contribute to an increase in strength and function advantageously to reduce the size of the ferrite and martensite. To obtain these functions, the content of Ti must be 0.01% or more. The content of Ti is preferably 0.02% or more. When a large amount of Ti is added, it is not possible to dissolve the entire amount of carbonitrides during re-heating in an ordinary hot-rolling process, and coarse carbonitrides remain present. The addition of a large amount of Ti causes not only deterioration in press formability but also an increase in alloy cost. Therefore, the content of Ti must be 0.10% or less. The content of Ti is from 0.01% to 0.10% inclusive.

Nb: From 0.01% to 0.10% Inclusive

Nb may be added because fine precipitates of Nb (mainly carbonitrides) contribute to an increase in strength and function advantageously to reduce the size of the ferrite and martensite. To obtain these functions through the contained Nb, the Nb content must be 0.01% or more. The Nb content is preferably 0.02% or more. When a large amount of Nb is added, it is not possible to dissolve the entire amount of carbonitrides during re-heating in an ordinary hot-rolling process, and coarse carbonitrides remain present. In this case, not only the press formability deteriorates, but also the alloy cost increases. Therefore, the content of Nb must be 0.10% or less. When Nb is contained, the content of Nb is from 0.01% to 0.10% inclusive, as described above.

Total Content of Ti and Nb: From 0.04% to 0.17% Inclusive

If the amount of fine precipitates of Ti and Nb is excessively small, it is difficult for non-recrystallized ferrite to remain in the final structure, so that it is difficult to ensure good punchability. Therefore, the total content of Ti and Nb must be 0.04% or more. If the amount of the fine precipitates is excessively large, a load for rolling during cold rolling increases disadvantageously. Therefore, the total content of Ti and Nb must be 0.17% or less. The total content is preferably from 0.06% to 0.16% inclusive. When the high-strength steel sheet of the present invention contains no Nb, the content of Ti must fall within the above range.

In addition to the above components, the chemical composition of the high-strength steel sheet of the present invention may further contain, in mass %, at least one selected from Mo: from 0.05% to 1.00% inclusive, Cr: from 0.05% to 1.00% inclusive, V: from 0.02% to 0.50% inclusive, Zr: from 0.02% to 0.20% inclusive, B: from 0.0001% to 0.0030% inclusive, Cu: from 0.05% to 1.00% inclusive, and Ni: from 0.05% to 1.00% inclusive.

Mo: From 0.05% to 1.00% Inclusive

Mo is an element that improves hardenability and contributes to strengthening through the formation of martensite. Mo may be contained as needed. To obtain these effects, the content of Mo is preferably 0.05% or more. If the content of Mo exceeds 1.00%, not only the above effects are saturated, but also the raw material cost increases. Therefore, preferably, the content of Mo is from 0.05% to 1.00% inclusive.

Cr: From 0.05% to 1.00% Inclusive

Cr is an element that improves hardenability and contributes to strengthening through the formation of martensite. Cr may be contained as needed. To obtain these effects, the content of Cr is preferably 0.05% or more. If the content of Cr exceeds 1.00%, not only the above effects are saturated, but also the raw material cost increases. Therefore, preferably, the content of Cr is from 0.05% to 1.00% inclusive.

V: From 0.02% to 0.50% Inclusive

V forms fine carbonitrides and can thereby contribute to an increase in strength, as do Nb and Ti. V may be contained as needed. To obtain the above effect, the content of V is preferably 0.02% or more. If the content of V exceeds 0.50%, not only the effect is saturated, but also the raw material cost increases. Therefore, preferably, the content of V is 0.50% or less. The content of V is more preferably 0.20% or less.

Zr: From 0.02% to 0.20% Inclusive

Zr also forms fine carbonitrides and is effective in increasing strength. Zr may be contained as needed. To obtain the above effect, the content of Zr must be 0.02% or more. If the content of Zr exceeds 0.20%, not only the effect is saturated, but also the raw material cost increases. Therefore, preferably, the content of Zr is from 0.02% to 0.20% inclusive.

B: From 0.0001% to 0.0030% Inclusive

B has the function of suppressing the formation and growth of ferrite from austenite grain boundaries and may be contained as needed. The effect of B is obtained when its content is 0.0001% or more. If the content of B exceeds 0.0030%, workability deteriorates. Therefore, when B is contained, its content is preferably within the range from 0.0001% to 0.0030% inclusive. When B is contained, it is preferable to prevent the formation of BN so that the above effect is obtained. Therefore, it is preferable that a combination of B and Ti is contained.

Cu: From 0.05% to 1.00% Inclusive

Cu is effective in increasing the hardenability of the steel to thereby strengthening a hot-rolled steel sheet. To obtain this effect, the content of Cu must be 0.05% or more. However, when the content of Cu exceeds 1.00%, not only the effect is saturated, but also hot ductility deteriorates, so that significant surface defects occur. In addition, the raw material cost increases. Therefore, preferably, the content of Cu is 0.05% to 1.00%.

Ni: From 0.05% to 1.00% Inclusive

Ni is effective in increasing the hardenability of the steel to thereby strengthening a hot-rolled steel sheet. To obtain this effect, the content of Ni must be 0.05% or more. However, when the content of Ni exceeds 1.00%, not only the effect is saturated, but also hot ductility deteriorates, so that significant surface defects occur. In addition, the raw material cost increases. Therefore, preferably, the content of Ni is 0.05% to 1.00%.

In addition to the above components, the chemical composition of the high-strength steel sheet of the present invention may further contain, in mass %, at least one element selected from Ca: from 0.001% to 0.005% inclusive, Sb: from 0.0030% to 0.0100% inclusive, and REM: from 0.001% to 0.005% inclusive.

Ca: From 0.001% to 0.005% Inclusive

Ca has the effect of improving ductility through control of the morphology of sulfides such as MnS. However, even when a large amount of Ca is contained, the effect tends to be saturated. Therefore, when Ca is contained, its content is preferably from 0.0001% to 0.0050% inclusive.

Sb: From 0.0030% to 0.0100% Inclusive

Sb is an element that tends to segregate on the surface etc. and has the function of suppressing reactions in a surface layer during production steps such as nitrogen absorption and decarbonization. The addition of Sb allows reactions of elements such as nitrogen and carbon whose contents are likely to vary to be suppressed even when the steel material is exposed to a high-temperature atmosphere during heating in a hot-rolling step or during annealing, and therefore Sb has the effect of preventing significant component variations. In the present invention, when Sb is contained, it is preferable that the content of Sb is 0.0030% to 0.0100%. In the present invention, it is more preferable that the content of Sb is 0.0060% to 0.0100%.

REM: From 0.001% to 0.005% Inclusive

REM has the function of controlling the morphology of sulfide-based inclusions and thereby contributes to improvement in press formability. To obtain this effect, the content of REM must be 0.001% or more. However, the addition of a large amount of REM causes the sulfide-based inclusions to be coarsened, and punchability deteriorates. Therefore, the upper limit of the content of REM is preferably 0.005% or less.

In the chemical composition in the present invention, the balance other than the above elements is Fe and unavoidable impurities.

The basic composition of the present invention has been described. However, in the present invention, it is not sufficient that the above basic composition be simply satisfied, and it is necessary that the contents of C, N, S, Nb, and Ti satisfy the relation represented by formula (1) below. In formula (1) below, each element symbol represents the content (% by mass) of the element.

$$0.05 \leq C - (12/93)Nb - (12/48)(Ti - (48/14)N - (48/32)S) \leq 0.10 \quad (1)$$

In formula (1) above, "C−(12/93)Nb−(12/48) (Ti−(48/14) N−(48/32)S)" defines the content of C not fixed as carbides. If the content of C exceeds 0.10%, the fraction of the martensite increases, and the ductility decreases. Therefore, the content of C must be 0.10% or less. If the content of C not fixed as carbides is less than 0.05%, the content of C in austenite during annealing in a two-phase region after cold-rolling becomes small, and therefore the amount of martensite phase formed after cooling becomes small in some cases, so that it may be difficult to obtain a high strength of 780 MPa or more. Therefore, the content of C not fixed as carbides must be 0.05% or more. The content of C is preferably 0.07% or more.

Next, the steel structure of the high-strength steel sheet of the present invention will be described. The steel structure of the high-strength steel sheet of the present invention contains a ferrite phase at an area fraction of from 70% to 90% inclusive and a martensite phase at an area fraction of from 10% to 30% inclusive. The amount of non-recrystallized ferrite contained in the ferrite phase is from 30% to 50% inclusive. In the martensite phase, the area fraction of crystal grains with an aspect ratio of from 1.0 to 1.5 inclusive is 40% to 100%. When the steel structure at a depth of ⅜ the thickness of the sheet from its surface is within the above ranges, the effects of the present invention are obtained.

Area Fraction of Ferrite Phase: From 70% to 90% Inclusive

The ferrite phase is a soft phase and contributes to the ductility of the steel sheet. In the present invention, the area fraction of the ferrite phase is 70% or more. If the area fraction of the ferrite phase present exceeds 90%, it is difficult to ensure a TS of 780 MPa or more stably. Therefore, the area fraction of the ferrite phase is from 70% to 90% inclusive. In the present invention, the ferrite phase is intended to encompass not only recrystallized ferrite but also recovered ferrite and non-recrystallized ferrite.

Non-Recrystallized Ferrite in Ferrite Phase: From 30% to 50% Inclusive

In the present invention, the non-recrystallized ferrite plays an important role in ensuring formability of punched edge faces. Specifically, when a certain proportion (certain percentage) of the ferrite phase is the non-recrystallized ferrite, voids are likely to be formed suitably during punching. Therefore, even when the punching clearance fluctuates, the punched edge face state of the steel sheet is less likely to vary, so that the steel sheet obtained can have excellent formability of punched edge faces. If the ratio of the non-recrystallized ferrite in the ferrite phase is less than 30% or exceeds 50%, the punched edge face state of the steel sheet varies when the punching clearance fluctuates. To ensure the stable punchability, the area fraction of the non-recrystallized ferrite is more preferably from 35% to 45% inclusive.

Area Fraction of Martensite Phase: From 10% to 30% Inclusive

The martensite phase is a hard phase and is effective in increasing the strength of the steel sheet through transformation strengthening. To stably ensure a TS of 780 MPa or more, the area fraction of the martensite phase must be 10% or more. Since the martensite phase is hard, it may serve as origins of voids formed during punching because of the difference in formability between the martensite phase and the soft ferrite phase. To ensure stable punchability, the martensite phase must be present at a certain area fraction or more, and the area fraction is preferably 10% or more. If the area fraction of the martensite phase exceeds 30%, the punchability may deteriorate. Therefore, the area fraction of the martensite phase is 30% or less. Preferably, the area fraction of the martensite phase is 25% or less.

The steel structure includes the ferrite phase and the martensite phase, and the rest of the structure may include a perlite phase, a bainite phase, a retained austenite phase, carbides, etc. The allowable content of these phases is such that their total area fraction is 3% or less. The total area fraction is preferably 1% or less.

Area Fraction of Crystal Grains with Aspect Ratio of from 1.0 to 1.5 Inclusive in Martensite Phase: 40% to 100%

Since the martensite phase is a hard phase, voids are easily formed at its boundaries when the steel sheet is processed. Voids are more likely to be formed in grains elongated in the rolling direction than in spherical grains. Moreover, in the grains elongated in the rolling direction, joining of voids is facilitated. Therefore, in the martensite phase, the ratio of crystal grains with an aspect ratio of from 1.0 to 1.5 inclusive is 40% to 100% and preferably 40% to 90%. More preferably, the ratio of the crystal grains with an aspect ratio of from 1.0 to 1.3 inclusive is 30 to 60%. The aspect ratio in the martensite phase is determined using an SEM photograph taken at a magnification of 5,000× using an SEM. Specifically, the major axis and minor axis of each individual martensite grain are measured, and the major axis is divided by the minor axis to determine the aspect ratio.

Average Grain Diameter of Martensite Phase: 2.0 μm or Less

The average grain diameter (average crystal grain diameter) of the martensite phase differs from the grain diameter of prior austenite during annealing but is equal to the grain diameter of the prior austenite after quenching. In the present invention, the grain diameters of the martensite phase after secondary annealing may affect the formation of voids during punching. When the martensite phase contains coarse crystal grains, voids are likely to be formed. It is therefore preferable that the crystal grains are small. The average grain diameter of the martensite phase is preferably 2.0 μm or less and more preferably 1.8 μm or less.

<Method for Producing High-Strength Steel Sheet>

Next, a description will be given of a method for producing the high-strength steel sheet of the present invention. The high-strength steel sheet of the present invention is produced by subjecting a steel slab having the chemical composition described above to hot rolling, cold rolling, primary annealing, optional light reduction rolling, optional pickling, and then secondary annealing. The production method and conditions will next be described.

If the temperature at which the steel slab is reheated is lower than 1,200° C., precipitates containing Ti and/or Nb do not re-dissolve but are coarsened. In this case, not only the precipitation strengthening ability of the precipitates is lost, but also their pinning effect of preventing recrystallization is lost, so that it may be difficult to ensure stable punchability. Therefore, preferably, the temperature at which the steel slab is reheated is 1,200° C. or higher. No particular limitation is imposed on the upper limit of the reheating temperature. In terms of energy efficiency and yield, the reheating temperature is preferably lower than 1,400° C. and more preferably 1,300° C. or lower.

If the finishing temperature of the hot rolling is equal to or lower than the Ar3 point, coarse grains are formed in a surface layer, and therefore it is difficult to form a uniform steel structure, so that stable punchability may not be obtained. It is preferable that the finishing temperature is equal to or higher than the Ar3 point. No particular limitation is imposed on the upper limit of the finishing temperature. Preferably, the finishing temperature is 1,000° C. or lower.

If the coiling temperature is lower than 500° C., the amount of precipitates containing Ti and/or Nb is small, and the effect of preventing recrystallization during annealing may not be obtained sufficiently. If the coiling temperature is higher than 700° C., coarse precipitates are formed, and the effect of preventing recrystallization during annealing may not be sufficient. Therefore, preferably, the coiling temperature is 500° C. to 700° C. The coiling temperature is more preferably 550° C. to 650° C.

If necessary, the hot-rolled steel sheet is then pickled according to a routine procedure to remove scales. Then the resulting hot-rolled steel sheet is cold-rolled to produce a cold-rolled steel sheet with a final thickness. The rolling reduction in the cold rolling is preferably 40% or more. A rolling reduction of less than 40% is not preferable because the steel sheet structure after finish annealing is coarse-grained and the strength-ductility balance may deteriorate. The rolling reduction is more preferably 50% or more. If the rolling reduction exceeds 90%, a load on the rolling rolls increases, and rolling troubles such as chattering and breakage of the sheet occur. Therefore, preferably, the rolling reduction in the cold rolling is 90% or less. The rolling reduction is more preferably 80% or less.

The cold-rolled steel sheet is then subjected to primary annealing. It is preferable in terms of improving productivity that the primary annealing is performed as continuous annealing. The annealing temperature (Ta1 (° C.)) in the primary annealing must satisfy formula (2) and formula (3). When these formulas are satisfied, an appropriate amount of non-recrystallized structure can remain after the secondary annealing. In terms of obtaining an optimal steel structure after the secondary annealing, it is also important for the annealing time (t1) in the primary annealing to satisfy formula (3) below.

$$0.50 \leq (Ta1-Ac1)/(Ac3-Ac1) \leq 0.85 \quad (2)$$

$$-0.0012t1+0.65 \leq (Ta1-Ac1)/(Ac3-Ac1) \leq -0.0025t1+1.0 \quad (3)$$

Here, Ac1 (° C.) and Ac3 (° C.) can be determined using the following formulas. In the following formulas, each element symbol represents the content (% by mass) of the element and is 0 when the element is not contained.

$$Ac1(° C.)=723+29.1Si-10.7Mn-16.9Ni+16.9Cr$$

$$Ac3(° C.)=910-203(C)^{1/2}+44.7Si-30Mn+700P+\\400Al-15.2Ni-11Cr-20Cu+31.5Mo+104V+\\400Ti$$

The annealing time in the primary annealing is from 10 seconds to 200 seconds inclusive. If the annealing time is shorter than 10 seconds, recrystallization does not proceed sufficiently, and a steel sheet with the desired properties cannot be obtained. If the primary annealing time exceeds 200 seconds, a large amount of energy is consumed, so that the production cost increases. Therefore, the primary annealing time is from 10 seconds to 200 seconds inclusive.

Preferably, the cooling rate (average cooing rate) during cooling in the primary annealing is 10° C./s or more. If the average cooing rate is less than 10° C./s, a large amount of perlite is formed, and a complex structure composed mainly of the ferrite and martensite phases may not be obtained. The upper limit of the average cooing rate is not particularly specified. However, to prevent deterioration of the shape of the steel sheet, the average cooling rate is preferably 200° C./s or less.

After the primary annealing, the resulting steel sheet is subjected to light reduction rolling and then pickling. The light reduction rolling is not essential but is performed for the purpose of correcting the shape of the steel sheet. For this purpose, it is preferable that the rolling reduction is 0.3% to 3.0%. The pickling is also not essential but is performed to remove scales, and general conditions may be appropriately used.

The steel sheet subjected to the light reduction rolling and the pickling after the primary annealing is then subjected to secondary annealing. It is preferable that also the secondary annealing is performed as continuous annealing. The annealing temperature (Ta2 (° C.)) in the secondary annealing must satisfy formula (4). By performing the secondary annealing such that formula (4) is satisfied, a steel sheet excellent in punchability can be obtained.

$$0.70 \leq (Ta2-Ac1)/(Ac3-Ac1) \leq 0.95 \quad (4)$$

Ac1 and Ac3 can be calculated using the above-described formulas.

The annealing time in the secondary annealing is from 10 seconds to 100 seconds inclusive. If the annealing time in the secondary annealing is shorter than 10 seconds, recrystallization is excessively suppressed, and a steel sheet with the desired properties cannot be obtained. If the annealing time in the secondary annealing exceeds 100 seconds, a large amount of energy is consumed, and the production cost increases. Therefore, preferably, the annealing time in the secondary annealing is from 10 seconds to 100 seconds inclusive.

Preferably, the cooling rate (average cooing rate) during cooling in the secondary annealing is 10° C./s or more. If the average cooing rate is less than 10° C./s, a large amount of perlite is formed, and a complex structure composed mainly of the ferrite and martensite phases may not be obtained. The upper limit of the average cooing rate is not particularly specified. However, to prevent deterioration of the shape of the steel sheet, the cooling rate is preferably 200° C./s or less.

The high-strength steel sheet of the present invention can be produced in the manner described above. The high-strength steel sheet obtained as described above may be used as a product without any other treatment or may be cooled and subjected to coating treatment such as hot-dip coating or electroplating to obtain a product.

For example, when the coating treatment used is hot-dip galvanization widely used for automobile steel sheets etc., the treatment may be performed as follows. After the above-described soaking and cooling treatment or further the overaging treatment performed after the soaking and cooling treatment performed in an upstream continuous annealing furnace in a hot-dip galvanization line, the steel sheet is immersed in a hot-dip galvanization bath to form a hot-dip galvanized layer on the surface of the steel sheet. Then the resulting steel sheet may be subjected to an alloying treatment to form a galvannealed steel sheet. The continuous annealing including the soaking and cooling treatment or including the soaking and cooling treatment and the overaging treatment may be separated from the coating treatment, and they may be performed in different lines.

The galvanized layer is a layer containing mainly Zn. The galvannealed layer is a layer containing mainly an Fe—Zn alloy that is formed by diffusion of Fe in the steel into the galvanized coating through a galvannealing reaction.

The galvanized layer and the galvannealed layer may contain Fe, Al, Sb, Pb, Bi, Mg, Ca, Be, Ti, Cu, Ni, Co, Cr, Mn, P, B, Sn, Zr, Hf, Sr, V, Se, and REM in addition to Zn so long as the effects of the present invention are not impaired.

The annealed steel sheet or the steel sheet subjected to the coating treatment may be subjected to temper rolling or levelling for the purpose of shape correction, surface roughness adjustment, improvement in mechanical properties, etc. The total percentage elongation in the temper rolling and the levelling is preferably within the range of 0.2% to 3%. This is because, if the total percentage elongation is less than 0.2%, the prescribed purposes such as shape correction are not achieved. If the total percentage elongation exceeds 3%, a significant reduction in ductility occurs.

Example 1

Molten steel having a chemical composition shown in Table 1 was produced in a converter, and then a slab was obtained. Then hot rolling was performed at a slab reheating temperature of 1,200° C., a hot-rolling finishing temperature of 880° C., and a coiling temperature of 600° C., followed by pickling and cold rolling at a rolling reduction of 60%. Then only primary annealing or the primary annealing, light reduction rolling at 0.5%, pickling, and secondary annealing were performed under conditions shown in Table 2 to produce a cold-rolled steel sheet with a thickness of 1.2 mm, a hot-dip galvanized steel sheet (GI steel sheet), and a galvannealed steel sheet (GA steel sheet). In this case, the hot-dip galvanization treatment was performed such that the coating weight per side was adjusted to 50 g/m$^2$ (double-sided coating). As for the GA steel sheet, the percentage of Fe in the coating layer was adjusted to 9% to 12% by mass. In each of the primary annealing and the secondary annealing, the average cooing rate was 20° C./s, respectively.

TABLE 1

| | C | Si | Mn | P | S | sol. Al | N | Ti | Nb | V | B | Cr | Mo |
|---|---|---|---|---|---|---|---|---|---|---|---|---|---|
| A | 0.102 | 0.03 | 2.04 | 0.012 | 0.0018 | 0.036 | 0.0034 | 0.056 | | | | | 0.22 |
| B | 0.093 | 0.21 | 1.88 | 0.014 | 0.0018 | 0.037 | 0.0031 | 0.021 | 0.081 | | | | 0.12 |
| C | 0.076 | 0.04 | 1.64 | 0.014 | 0.0018 | 0.037 | 0.0031 | 0.033 | 0.032 | | | | |
| D | 0.073 | 0.41 | 2.21 | 0.012 | 0.0015 | 0.034 | 0.0028 | 0.020 | 0.079 | 0.03 | | | |
| E | 0.091 | 0.02 | 2.01 | 0.013 | 0.0017 | 0.036 | 0.0035 | 0.044 | 0.032 | | 0.0012 | | |
| F | 0.090 | 0.02 | 1.88 | 0.011 | 0.0014 | 0.033 | 0.0033 | 0.081 | | | | | |
| G | 0.089 | 0.03 | 2.03 | 0.012 | 0.0015 | 0.036 | 0.0031 | 0.047 | 0.081 | | | | |
| H | 0.105 | 0.25 | 2.21 | 0.012 | 0.0015 | 0.065 | 0.0035 | 0.088 | 0.041 | | | 0.21 | |
| I | 0.124 | 0.24 | 2.19 | 0.013 | 0.0012 | 0.051 | 0.0024 | 0.095 | 0.071 | | | | |
| J | 0.101 | 0.32 | 2.01 | 0.014 | 0.0014 | 0.037 | 0.0030 | 0.120 | 0.022 | | | | |
| K | 0.050 | 0.02 | 2.20 | 0.015 | 0.0020 | 0.034 | 0.0028 | 0.066 | | | 0.0015 | | |
| L | 0.083 | 0.23 | 2.02 | 0.011 | 0.0017 | 0.036 | 0.0033 | 0.090 | 0.092 | | | | |
| M | 0.090 | 0.60 | 1.40 | 0.009 | 0.0012 | 0.040 | 0.0038 | 0.078 | | | | | 0.24 |
| N | 0.141 | 0.03 | 2.10 | 0.010 | 0.0015 | 0.035 | 0.0034 | 0.052 | 0.083 | | | | |
| O | 0.107 | 0.18 | 2.00 | 0.008 | 0.0015 | 0.030 | 0.0032 | 0.020 | 0 | | | | |
| P | 0.089 | 0.02 | 2.54 | 0.009 | 0.0016 | 0.050 | 0.0033 | 0.051 | 0.033 | | | | |

| | Cu | Ni | Others | Ti + Nb | C* | Remarks |
|---|---|---|---|---|---|---|
| A | | | | 0.056 | 0.092 | Inventive Example |
| B | | | | 0.102 | 0.081 | Inventive Example |
| C | | | REM 0.03 | 0.065 | 0.067 | Inventive Example |
| D | | | | 0.099 | 0.061 | Inventive Example |
| E | | | | 0.076 | 0.080 | Inventive Example |
| F | 0.21 | 0.09 | | 0.081 | 0.073 | Inventive Example |
| G | | | | 0.128 | 0.070 | Inventive Example |
| H | | | Zr 0.02 | 0.129 | 0.081 | Inventive Example |
| I | | | Ca 0.0020, Sb 0.0080 | 0.166 | 0.094 | Inventive Example |
| J | | | | 0.142 | 0.071 | Comparative Example |
| K | | | | 0.066 | 0.037 | Comparative Example |
| L | | | | 0.182 | 0.052 | Comparative Example |
| M | | | | 0.078 | 0.074 | Comparative Example |
| N | | | | 0.135 | 0.121 | Comparative Example |
| O | | | | 0.020 | 0.105 | Comparative Example |
| P | | | | 0.084 | 0.075 | Comparative Example |

C*: C−(12/93)Nb−(12/48)(Ti−(48/14)N−(48/32)S)

TABLE 2

| Steel sheet | Steel | Ac1 (°C.) | Ac3 (°C.) | Primary annealing Annealing temperature (°C.) | Annealing time (s) | Secondary annealing Annealing temperature (°C.) | Annealing time (s) | Formula (2) *1 | Formula (3) *2 | Formula (4) *3 | Coating | Remarks |
|---|---|---|---|---|---|---|---|---|---|---|---|---|
| 1 | A | 702 | 837 | 790 | 50 | 800 | 30 | 0.65 | A | 0.72 | No | Inventive Example |
| 2 | | | | 790 | 50 | 815 | 30 | 0.65 | A | 0.83 | Yes(GA) | Inventive Example |
| 3 | | | | 790 | 50 | 850 | 30 | 0.65 | A | 1.09 | Yes(GA) | Comparative Example |
| 4 | | | | 790 | 150 | 830 | 30 | 0.65 | C | 0.95 | Yes(GA) | Comparative Example |
| 5 | | | | 790 | 50 | 830 | 300 | 0.65 | A | 0.95 | No | Comparative Example |
| 6 | | | | 790 | 50 | — | — | 0.65 | A | — | Yes(GA) | Comparative Example |
| 7 | | | | 825 | 50 | — | — | 0.91 | C | — | Yes(GA) | Comparative Example |
| 8 | | | | 825 | 50 | 830 | 30 | 0.91 | C | 0.95 | Yes(GA) | Comparative Example |
| 9 | | | | 850 | 50 | 830 | 30 | 1.09 | C | 0.95 | Yes(GI) | Comparative Example |
| 10 | B | 709 | 838 | 750 | 50 | 820 | 30 | 0.32 | C | 0.86 | No | Comparative Example |
| 11 | | | | 790 | 50 | 800 | 30 | 0.63 | A | 0.71 | Yes(GI) | Inventive Example |
| 12 | | | | 790 | 50 | 800 | 150 | 0.63 | A | 0.71 | Yes(GA) | Inventive Example |
| 13 | | | | 790 | 50 | 850 | 30 | 0.63 | A | 1.09 | Yes(GA) | Comparative Example |
| 14 | | | | 815 | 50 | 780 | 30 | 0.82 | A | 0.55 | Yes(GA) | Comparative Example |
| 15 | | | | 815 | 300 | 820 | 30 | 0.82 | C | 0.86 | Yes(GA) | Comparative Example |
| 16 | | | | 790 | 50 | — | — | 0.63 | A | — | Yes(GA) | Comparative Example |
| 17 | | | | 850 | 50 | — | — | 1.09 | C | — | Yes(GA) | Comparative Example |
| 18 | C | 707 | 843 | 790 | 50 | 820 | 30 | 0.61 | A | 0.83 | No | Inventive Example |
| 19 | | | | 790 | 50 | 820 | 100 | 0.61 | A | 0.83 | Yes(GI) | Inventive Example |
| 20 | | | | 790 | 50 | 790 | 30 | 0.61 | A | 0.61 | Yes(GI) | Comparative Example |
| 21 | | | | 825 | 50 | 850 | 30 | 0.87 | A | 1.05 | Yes(GI) | Comparative Example |
| 22 | D | 711 | 840 | 790 | 50 | 815 | 30 | 0.61 | A | 0.80 | No | Inventive Example |
| 23 | | | | 790 | 50 | 815 | 100 | 0.61 | A | 0.80 | Yes(GI) | Inventive Example |
| 24 | | | | 790 | 50 | 850 | 30 | 0.61 | A | 1.08 | Yes(GI) | Comparative Example |
| 25 | E | 702 | 830 | 790 | 50 | 805 | 30 | 0.68 | A | 0.80 | Yes(GI) | Inventive Example |
| 26 | F | 702 | 841 | 790 | 50 | 810 | 30 | 0.63 | A | 0.78 | Yes(GA) | Inventive Example |
| 27 | G | 702 | 831 | 790 | 50 | 810 | 30 | 0.68 | A | 0.83 | Yes(GA) | Inventive Example |

TABLE 2-continued

| Steel sheet | Steel | Ac1 (° C.) | Ac3 (° C.) | Primary annealing Annealing temperature (° C.) | Annealing time (s) | Secondary annealing Annealing temperature (° C.) | Annealing time (s) | Formula (2) *1 | Formula (3) *2 | Formula (4) *3 | Coating | Remarks |
|---|---|---|---|---|---|---|---|---|---|---|---|---|
| 28 | H | 710 | 856 | 800 | 50 | 820 | 30 | 0.61 | A | 0.75 | Yes(GI) | Inventive Example |
| 29 | I | 707 | 851 | 800 | 50 | 810 | 30 | 0.65 | A | 0.72 | Yes(GI) | Inventive Example |
| 30 | J | 711 | 872 | 790 | 50 | 820 | 30 | 0.49 | C | 0.68 | Yes(GA) | Comparative Example |
| 31 | K | 700 | 850 | 790 | 50 | 820 | 30 | 0.60 | A | 0.80 | Yes(GA) | Comparative Example |
| 32 | L | 708 | 859 | 790 | 50 | 820 | 30 | 0.54 | C | 0.74 | Yes(GA) | Comparative Example |
| 33 | M | 725 | 895 | 790 | 50 | 820 | 30 | 0.38 | C | 0.56 | Yes(GA) | Comparative Example |
| 34 | N | 701 | 814 | 790 | 50 | 820 | 30 | 0.79 | A | 1.05 | Yes(GI) | Comparative Example |
| 35 | O | 707 | 817 | 790 | 50 | 820 | 30 | 0.75 | A | 1.02 | Yes(GI) | Comparative Example |
| 36 | P | 696 | 821 | 790 | 50 | 820 | 30 | 0.75 | A | 0.99 | Yes(GI) | Comparative Example |
| 37 | A | 702 | 837 | 775 | 150 | 815 | 30 | 0.54 | A | 0.83 | Yes(GA) | Inventive Example |
| 38 | | | | 765 | 220 | 815 | 30 | 0.46 | C | 0.83 | Yes(GA) | Comparative Example |
| 39 | B | 709 | 838 | 790 | 100 | 810 | 30 | 0.63 | A | 0.78 | Yes(GA) | Inventive Example |
| 40 | C | 707 | 843 | 815 | 50 | 820 | 30 | 0.79 | A | 0.83 | Yes(GA) | Inventive Example |
| 41 | | | | 820 | 100 | 820 | 30 | 0.83 | C | 0.83 | Yes(GA) | Comparative Example |
| 42 | | | | 710 | 50 | 740 | 30 | 0.02 | C | 0.24 | Yes(GA) | Comparative Example |

*1: (Ta1 − Ac1)/(Ac3 − Ac1)
*2: −0.0012 t1 + 0.65 ≤ (Ta1 − Ac1)/(Ac3 − Ac1) ≤ −0.0025 t1 + 1.0. An "A" rating is given when this relation holds. A "C" rating is given when this relation does not hold.
*3: (Ta2 − Ac1)/(Ac3 − Ac1)

Samples were taken from the steel sheets obtained as described above. Then steel structure identification, a tensile test in which a direction 90° with respect to the rolling direction (C direction) was used as a tensile direction, and a hole expansion test were performed using methods described below. Specifically, the following were measured: the area fractions of the ferrite and martensite phases: the ratio of the non-recrystallized ferrite phase in the ferrite phase; the average crystal grain diameter of the martensite; the yield strength (YS); the tensile strength (TS); the total elongation (E1); and the hole expansion ratio ($\lambda$).

Next, evaluation methods will be specifically described.

(i) Steel Structure Identification

A specimen for structure observation was taken from a steel sheet. An L cross section (a vertical cross section parallel to the rolling direction) was mechanically polished and etched with nital, and an image of the cross section was taken at a magnification of 3,000× using a scanning electron microscope (SEM). Using the structure photograph (SEM photograph) taken at a depth of ⅜ the thickness of the sheet from its surface, steel sheet structure identification was performed, and the area fractions of the ferrite and martensite phases were measured. To determine the area fractions of different phases, the structure photograph was transferred onto a transparency. Then the transferred image was colored such that these phases were distinguishable. Then the resulting image was captured and binarized, and the area fractions were determined using image analysis software. The area fraction of the non-recrystallized ferrite in the ferrite was determined by crystal orientation measurement using an EBSP. In the present application, it is only necessary to identify the area fraction of the non-recrystallized ferrite in the ferrite, and it is not necessary to distinguish the recrystallized ferrite and the recovered ferrite from each other. The average grain diameter of the martensite was determined a using a cutting method according to the specifications of JIS G 0522. The aspect ratio in the martensite phase was determined using an SEM photograph taken at a magnification of 5,000× using an SEM. Specifically, the major axis and minor axis of each individual martensite grain were measured, and the major axis was divided by the minor axis to determine the aspect ratio.

(ii) Tensile Properties

A JIS No. 5 tensile test specimen (JIS Z 2201) in which a direction 90° with respect to the rolling direction (C direction) was used as a tensile direction was taken from a steel sheet, and a tensile test was performed according to the specifications of JIS Z 2241 to measure the YS, TS, and E1. The criterion (pass/fail criterion) of the tensile test was TS≥780 MPa.

(iii) Stretch Flangeability

The stretch flangeability was evaluated using a hole expansion test according to The Japan Iron and Steel Federation Standard JFS T 1001. Specifically, a 100 mm×100 mm square sample was taken from one of the steel sheets obtained. A hole was punched in the sample using a punch with a diameter of 10 mm, and then the hole expansion test was performed using a conical punch with a vertex angle of 60° with the burrs located outside until a crack passing through the sheet occurred. In this case, the initial inner diameter (mm) of the hole was defined as d0, and the inner diameter (mm) of the hole when the crack occurred was defined as d. Then a hole expansion ratio $\lambda$ (%)={(d−d0)/d0}×100 was determined. In the present invention, the punchability was judged as good when the following criteria were satisfied: $\Delta\lambda$ defined below is 10 or less. $\lambda/\text{ave}\lambda_{5\text{-}20}$ defined below is from 0.90 to 1.20 inclusive.

$\Delta\lambda$ $\Delta\lambda$ represents the difference between the maximum and minimum of the $\lambda$ values evaluated when punching was performed with the punching clearance falling within the range of 5% to 20%. For simplicity, the difference between the maximum and minimum among three values including $\lambda$ measured according to The Japan Iron and Steel Federation Standard JFS T 1001 and $\lambda$ values ($\lambda_5$ and $\lambda_{20}$) measured with target clearances set to 5% and 20% may be used as a substitute for the above difference. A value obtained with the clearance deviating by up to ±1% from a target clearance may be used for the evaluation.

$\lambda/\text{ave}\lambda_{5\text{-}20}$ $\lambda/\text{ave}\lambda_{5\text{-}20}$ represents a value obtained by dividing the $\lambda$ measured according to The Japan Iron and Steel Federation Standard JFS T 1001 by the average of $\lambda$ values evaluated when punching was performed with the punching clearance falling within the range of 5% to 20%. For simplicity, a value obtained by division by the average of three values including the λ measured according to The Japan Iron and Steel Federation Standard JFS T 1001 and the λ values ($\lambda_5$ and $\lambda_{20}$) measured with target clearances set to 5% and 20% may be used as a substitute for the above value. A value obtained with the clearance deviating by up to ±1% from a target clearance may be used for the evaluation.

The results obtained are shown in Table 3.

TABLE 3

| Steel sheet | Steel | Ferrite (%) | Non-recrystallized F (%) | Ratio of non-recrystallized ferrite in ferrite phase (%) | Martensite (%) | Grain size of martensite (μm) | Ratio of crystal grains with aspect ratio of from 1.0 to 1.5 *1 | Ratio of crystal grains with aspect ratio of from 1.0 to 1.3 *2 |
|---|---|---|---|---|---|---|---|---|
| 1 | A | 76 | 30 | 39.5% | 24 | 1.4 | 85 | 51 |
| 2 | | 72 | 25 | 34.7% | 28 | 1.3 | 84 | 55 |
| 3 | | 75 | 5 | 6.7% | 25 | 1.5 | 88 | 57 |
| 4 | | 69 | 15 | 21.7% | 31 | 1.4 | 86 | 54 |
| 5 | | 67 | 31 | 46.3% | 29 | 2.6 | 79 | 52 |
| 6 | | 75 | 42 | 56.0% | 25 | 1.8 | 49 | 19 |
| 7 | | 70 | 36 | 51.4% | 30 | 1.7 | 57 | 27 |
| 8 | | 77 | 14 | 18.2% | 23 | 1.7 | 84 | 54 |
| 9 | | 74 | 11 | 14.9% | 26 | 3.5 | 87 | 65 |
| 10 | B | 74 | 39 | 52.7% | 26 | 1.7 | 65 | 28 |
| 11 | | 75 | 33 | 44.0% | 25 | 1.3 | 62 | 47 |
| 12 | | 74 | 30 | 40.5% | 26 | 1.4 | 64 | 52 |
| 13 | | 62 | 10 | 16.1% | 38 | 2.2 | 82 | 60 |
| 14 | | 72 | 12 | 16.7% | 28 | 1.7 | 55 | 42 |
| 15 | | 73 | 8 | 11.0% | 27 | 2.1 | 78 | 62 |
| 16 | | 70 | 36 | 51.4% | 30 | 1.8 | 54 | 24 |
| 17 | | 60 | 0 | 0.0% | 40 | 2.3 | 94 | 65 |
| 18 | C | 78 | 29 | 37.2% | 22 | 1.7 | 72 | 48 |
| 19 | | 76 | 27 | 35.5% | 24 | 1.8 | 79 | 51 |
| 20 | | 75 | 40 | 53.3% | 25 | 1.4 | 62 | 33 |
| 21 | | 79 | 0 | 0.0% | 21 | 3.2 | 88 | 63 |
| 22 | D | 75 | 29 | 38.7% | 25 | 1.6 | 64 | 45 |
| 23 | | 75 | 25 | 33.3% | 25 | 1.5 | 67 | 48 |
| 24 | | 72 | 2 | 2.8% | 28 | 1.6 | 79 | 67 |
| 25 | E | 74 | 27 | 36.5% | 26 | 1.4 | 72 | 51 |
| 26 | F | 73 | 30 | 41.1% | 27 | 1.3 | 68 | 49 |
| 27 | G | 72 | 32 | 44.4% | 28 | 1.5 | 73 | 53 |
| 28 | H | 77 | 28 | 36.4% | 23 | 1.7 | 75 | 48 |
| 29 | I | 75 | 29 | 38.7% | 25 | 1.8 | 65 | 52 |
| 30 | J | 75 | 21 | 28.0% | 25 | 1.4 | 59 | 42 |
| 31 | K | 81 | 15 | 18.5% | 19 | 1.8 | 63 | 46 |
| 32 | L | 70 | 28 | 40.0% | 30 | 1.6 | 65 | 37 |
| 33 | M | 56 | 20 | 35.7% | 44 | 1.6 | 62 | 33 |
| 34 | N | 54 | 0 | 0.0% | 46 | 1.5 | 88 | 61 |
| 35 | O | 55 | 1 | 1.8% | 45 | 1.4 | 91 | 58 |
| 36 | P | 53 | 4 | 7.5% | 47 | 1.5 | 87 | 59 |
| 37 | A | 71 | 33 | 46.5% | 29 | 1.3 | 81 | 48 |
| 38 | | 72 | 37 | 51.4% | 28 | 1.4 | 76 | 22 |
| 39 | B | 73 | 26 | 35.6% | 27 | 1.6 | 72 | 54 |
| 40 | C | 77 | 30 | 39.0% | 23 | 1.7 | 75 | 50 |
| 41 | | 77 | 21 | 27.3% | 23 | 1.8 | 82 | 52 |
| 42 | | 88 | 65 | 73.9% | 12 | 1.6 | 35 | 3 |

| Steel sheet | YS (MPa) | TS (MPa) | YR (%) | EL (%) | λ (%) | $\lambda_5$ | $\lambda_{20}$ | Δλ ($\lambda_{max} - \lambda_{min}$) | λ/(ave $\lambda_{5-20}$) | Remarks |
|---|---|---|---|---|---|---|---|---|---|---|
| 1 | 576 | 827 | 69.6 | 15.2 | 35 | 31 | 33 | 4 | 1.06 | Inventive Example |
| 2 | 635 | 905 | 70.2 | 11.2 | 30 | 22 | 25 | 8 | 1.17 | Inventive Example |
| 3 | 511 | 795 | 64.3 | 14.9 | 40 | 28 | 32 | 12 | 1.20 | Comparative Example |
| 4 | 534 | 846 | 63.1 | 13.9 | 37 | 25 | 31 | 12 | 1.19 | Comparative Example |
| 5 | 522 | 821 | 63.6 | 14.4 | 36 | 26 | 27 | 10 | 1.21 | Comparative Example |
| 6 | 635 | 887 | 71.6 | 12 | 27 | 18 | 22 | 9 | 1.21 | Comparative Example |
| 7 | 644 | 899 | 71.6 | 12.2 | 31 | 17 | 22 | 14 | 1.33 | Comparative Example |
| 8 | 521 | 782 | 66.6 | 16.4 | 38 | 27 | 29 | 11 | 1.21 | Comparative Example |
| 9 | 526 | 791 | 66.5 | 14.3 | 34 | 23 | 28 | 11 | 1.20 | Comparative Example |
| 10 | 582 | 835 | 69.7 | 12.4 | 28 | 19 | 22 | 9 | 1.22 | Comparative Example |
| 11 | 576 | 821 | 70.2 | 14.3 | 33 | 32 | 35 | 3 | 0.99 | Inventive Example |
| 12 | 581 | 819 | 70.9 | 13.9 | 32 | 27 | 29 | 5 | 1.09 | Inventive Example |
| 13 | 622 | 905 | 68.7 | 12.5 | 31 | 15 | 28 | 16 | 1.26 | Comparative Example |
| 14 | 532 | 823 | 64.6 | 13.2 | 40 | 29 | 31 | 11 | 1.20 | Comparative Example |
| 15 | 541 | 799 | 67.7 | 12.8 | 35 | 24 | 28 | 11 | 1.21 | Comparative Example |
| 16 | 564 | 856 | 65.9 | 13.1 | 38 | 25 | 29 | 13 | 1.24 | Comparative Example |
| 17 | 546 | 875 | 62.4 | 13.3 | 44 | 25 | 32 | 19 | 1.31 | Comparative Example |
| 18 | 536 | 786 | 68.2 | 14.7 | 35 | 29 | 30 | 6 | 1.12 | Inventive Example |
| 19 | 549 | 782 | 70.2 | 14.9 | 34 | 29 | 32 | 5 | 1.07 | Inventive Example |

TABLE 3-continued

| | | | | | | | | | | |
|---|---|---|---|---|---|---|---|---|---|---|
| 20 | 587 | 847 | 69.3 | 12.6 | 35 | 22 | 31 | 13 | 1.19 | Comparative Example |
| 21 | 445 | 692 | 64.3 | 14.6 | 41 | 25 | 35 | 16 | 1.22 | Comparative Example |
| 22 | 578 | 831 | 69.6 | 15.3 | 36 | 32 | 31 | 5 | 1.09 | Inventive Example |
| 23 | 583 | 826 | 70.6 | 15.8 | 38 | 34 | 35 | 4 | 1.07 | Inventive Example |
| 24 | 586 | 834 | 70.3 | 15.6 | 41 | 30 | 39 | 11 | 1.12 | Comparative Example |
| 25 | 567 | 803 | 70.6 | 15.9 | 45 | 38 | 40 | 7 | 1.10 | Inventive Example |
| 26 | 578 | 824 | 70.1 | 15.5 | 42 | 34 | 39 | 8 | 1.10 | Inventive Example |
| 27 | 581 | 826 | 70.3 | 15.7 | 42 | 36 | 38 | 6 | 1.09 | Inventive Example |
| 28 | 622 | 883 | 70.4 | 14.6 | 37 | 35 | 33 | 4 | 1.06 | Inventive Example |
| 29 | 656 | 921 | 71.2 | 14.1 | 35 | 36 | 31 | 5 | 1.03 | Inventive Example |
| 30 | 645 | 889 | 72.6 | 13.1 | 36 | 24 | 27 | 12 | 1.24 | Comparative Example |
| 31 | 444 | 664 | 66.9 | 17.8 | 65 | 41 | 52 | 24 | 1.23 | Comparative Example |
| 32 | 674 | 938 | 71.9 | 11.2 | 28 | 17 | 23 | 11 | 1.24 | Comparative Example |
| 33 | 624 | 967 | 64.5 | 12.0 | 26 | 15 | 23 | 11 | 1.22 | Comparative Example |
| 34 | 674 | 1024 | 65.8 | 9.8 | 24 | 13 | 22 | 11 | 1.22 | Comparative Example |
| 35 | 622 | 967 | 64.3 | 11.8 | 23 | 13 | 19 | 10 | 1.25 | Comparative Example |
| 36 | 615 | 945 | 65.1 | 12.5 | 26 | 15 | 23 | 11 | 1.22 | Comparative Example |
| 37 | 653 | 921 | 70.9 | 11.3 | 32 | 27 | 30 | 5 | 1.08 | Inventive Example |
| 38 | 647 | 911 | 71.0 | 10.8 | 28 | 17 | 22 | 11 | 1.25 | Comparative Example |
| 39 | 542 | 824 | 65.8 | 14.2 | 41 | 35 | 38 | 6 | 1.08 | Inventive Example |
| 40 | 562 | 826 | 68.0 | 15.2 | 33 | 26 | 33 | 7 | 1.08 | Inventive Example |
| 41 | 502 | 783 | 64.1 | 15.9 | 35 | 23 | 33 | 12 | 1.15 | Comparative Example |
| 42 | 654 | 781 | 83.7 | 8.4 | 13 | 8 | 11 | 5 | 1.22 | Comparative Example |

*1: Ratio of crystal grains with an aspect ratio of from 1.0 to 1.5 in martensite phase.
*2: Ratio of crystal grains with an aspect ratio of from 1.0 to 1.3 in martensite phase.

As can be seen from Table 3, steel sheets Nos. 1, 2, 11, 12, 18, 19, 22, 23, 25 to 29, 37, 39, and 40 are Inventive Examples in which their chemical composition and production method conform to the present invention. These steel sheets satisfy TS≥780 MPa or more. In these steel sheets, Δλ, which is an indicator of the punchability, is 10 or less, and λ/aveλ$_{5-20}$ is 0.90 to 1.20. Therefore, in these steel sheets, the formability of punched edge faces is good.

However, in Nos. 3 to 10, 13 to 17, 20, 21, 24, 30 to 36, 38, 41, and 42, which are Comparative Examples, their components are outside the range of the present invention, or the production conditions do not conform to the present invention. Therefore, the desired microstructure is not obtained, and the desired properties are not obtained. When both Δλ and λ/aveλ$_{5-20}$ do not meet the specifications, in particular when λ/aveλ$_{5-20}$ exceeds 1.20, it is difficult to stably ensure the formability of punched edge faces. In this case, when automobile structural components are produced using an actual press, the rate of occurrence of troubles such as press cracking is high.

INDUSTRIAL APPLICABILITY

According to the present invention, a high-strength steel sheet having a tensile strength of 780 MPa or more and excellent in punchability can be obtained. The high-strength steel sheet of the present invention is applicable to difficult-to-form members such as automobile structural members to which conventional high-strength steel sheets are not easily applied. When the high-strength steel sheet of the invention is used for automobile structural members, the steel sheet contributes to a reduction in weight of the automobiles, an improvement in safety, etc. and is therefore very useful from the industrial point of view.

The invention claimed is:
1. A high-strength steel sheet having a tensile strength of 780 MPa or more, the high-strength steel sheet having a chemical composition comprising, in mass %,
C: from 0.07% to 0.124% inclusive,
Si: from 0.01% to 0.50% inclusive,
Mn: from 1.6% to 2.4% inclusive,
P: from 0.001% to 0.050% inclusive,
S: from 0.0005% to 0.010% inclusive,
sol. Al: from 0.005% to 0.100% inclusive,
N: from 0.0001% to 0.0060% inclusive, and
Ti: from 0.01% to 0.10% inclusive
and optionally comprising
Nb: from 0.01% to 0.10% inclusive,
and further optionally, at least one group selected from the group consisting of Group A and B,
Group A which contains at least one selected from
Mo: from 0.05% to 1.00% inclusive,
Cr: from 0.05% to 1.00% inclusive,
V: from 0.02% to 0.50% inclusive,
Zr: from 0.02% to 0.20% inclusive,
B: from 0.0001% to 0.0030% inclusive,
Cu: from 0.05% to 1.00% inclusive, and
Ni: from 0.05% to 1.00% inclusive,
Group B which contains at least one element selected from
Ca: from 0.001% to 0.005% inclusive,
Sb: from 0.0030% to 0.0100% inclusive, and
REM: from 0.001% to 0.005% inclusive,
with the balance being Fe and unavoidable impurities, the total content of Ti and Nb being from 0.04% to 0.17% inclusive, the chemical composition satisfying formula (1) below,
wherein the high-strength steel sheet has a steel structure containing
a ferrite phase at an area fraction of from 70% to 90% inclusive and
a martensite phase at an area fraction of from 10% to 30% inclusive,
wherein the amount of non-recrystallized ferrite contained in the ferrite phase is from 30% to 50% inclusive,
wherein, in the martensite phase, the area fraction of crystal grains with an aspect ratio of from 1.0 to 1.5 inclusive is 40% to 100%:

$$0.05 \leq C-(12/93)Nb-(12/48)(Ti-(48/14)N-(48/32)S) \leq 0.10, \quad (1)$$

wherein, in formula (1), each element symbol represents the content of the element and is 0 when the element is not contained, and wherein the steel sheet has a stretch flangeability represented by a $\Delta\lambda$ value of 10 or less and a $\lambda/\text{ave}\lambda_{5-20}$ value of 0.90 to 1.20 inclusive, evaluated according to JFST 1001.

2. The high-strength steel sheet according to claim 1, wherein the martensite has an average grain diameter of 2.0 µm or less.

3. A method for producing the high-strength steel sheet according to claim 1, the method comprising subjecting a steel slab having the chemical composition according to claim 1 to hot rolling, cold rolling, primary annealing, and secondary annealing, wherein an annealing temperature (Ta1 (° C.)) in the primary annealing satisfies formula (2) below, wherein an annealing time (t1) in the primary annealing is from 10 seconds to 200 seconds inclusive, wherein the annealing temperature in the primary annealing and the annealing time in the primary annealing satisfy formula (3) below, wherein an annealing temperature (Ta2 (° C.)) in the secondary annealing satisfies formula (4) below, and wherein an annealing time in the secondary annealing is from 10 seconds to 100 seconds inclusive:

$$0.50 \leq (Ta1-Ac1)/(Ac3-Ac1) \leq 0.85, \qquad (2)$$

$$-0.0012t1+0.65 \leq (Ta1-Ac1)/(Ac3-Ac1) \leq -0.0025t1+1.0, \qquad (3)$$

$$0.70 \leq (Ta2-Ac1)/(Ac3-Ac1) \leq 0.85. \qquad (4)$$

4. The method for producing the high-strength steel sheet according to claim 3, the method further comprising, after the secondary annealing, performing cooling and then performing galvanization.

5. The method for producing the high-strength steel sheet according to claim 4, the method further comprising, after the galvanization, performing alloying treatment.

6. A method for producing the high-strength steel sheet according to claim 2, the method comprising subjecting a steel slab having the chemical composition according to claim 1 to hot rolling, cold rolling, primary annealing, and secondary annealing, wherein an annealing temperature (Ta1 (° C.)) in the primary annealing satisfies formula (2) below, wherein an annealing time (t1) in the primary annealing is from 10 seconds to 200 seconds inclusive, wherein the annealing temperature in the primary annealing and the annealing time in the primary annealing satisfy formula (3) below, wherein an annealing temperature (Ta2 (° C.)) in the secondary annealing satisfies formula (4) below, and wherein an annealing time in the secondary annealing is from 10 seconds to 100 seconds inclusive:

$$0.50 \leq (Ta1-Ac1)/(Ac3-Ac1) \leq 0.85, \qquad (2)$$

$$-0.0012t1+0.65 \leq (Ta1-Ac1)/(Ac3-Ac1) \leq -0.0025t1+1.0, \qquad (3)$$

$$0.70 \leq (Ta2-Ac1)/(Ac3-Ac1) \leq 0.85. \qquad (4)$$

7. The method for producing the high-strength steel sheet according to claim 6, the method further comprising, after the secondary annealing, performing cooling and then performing galvanization.

8. The method for producing the high-strength steel sheet according to claim 7, the method further comprising, after the galvanization, performing alloying treatment.

* * * * *